Feb. 7, 1961  R. A. BROWN  2,970,361
MOLDING MACHINE
Filed June 17, 1957  3 Sheets-Sheet 2
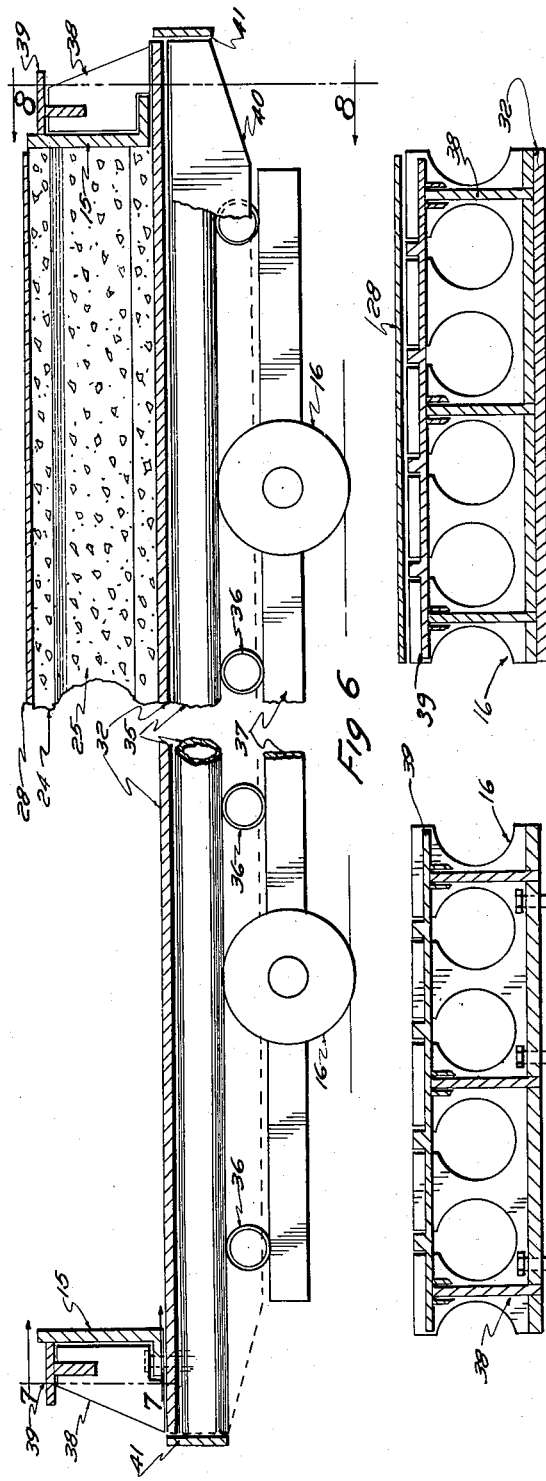
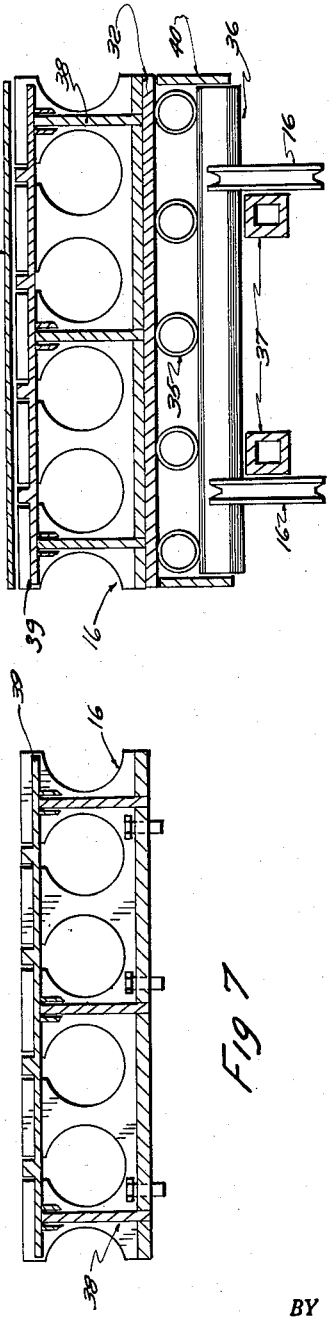
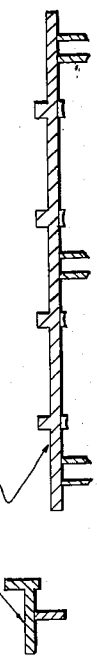
INVENTOR.
BY Robert A. Brown Feb. 7, 1961
R. A. BROWN
2,970,361
MOLDING MACHINE
Filed June 17, 1957
3 Sheets-Sheet 3
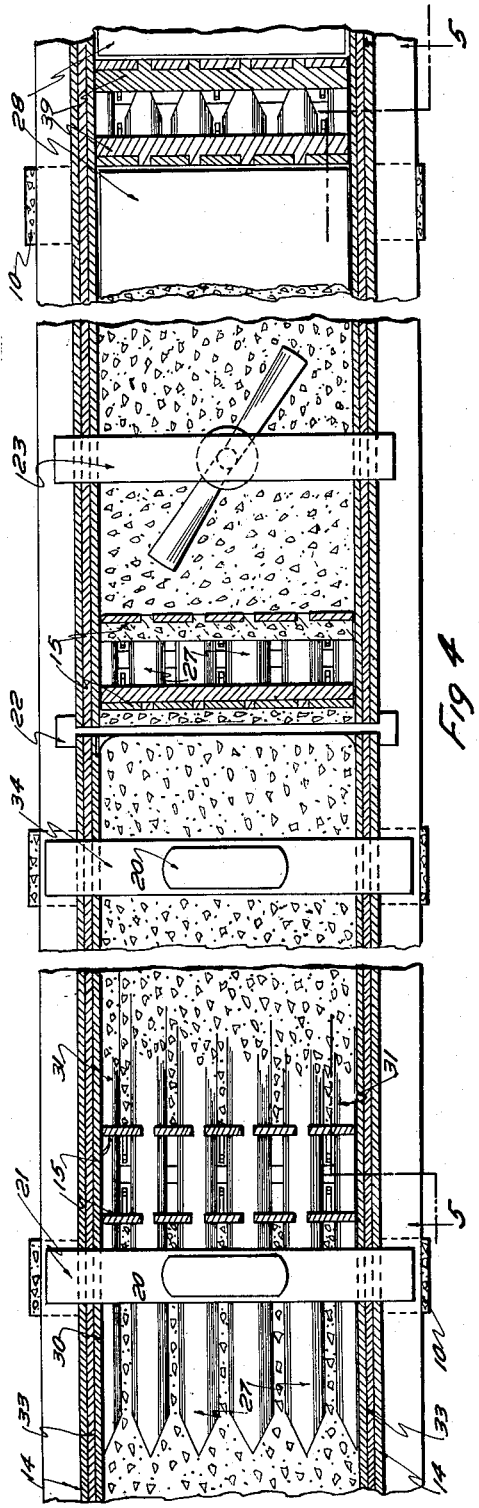
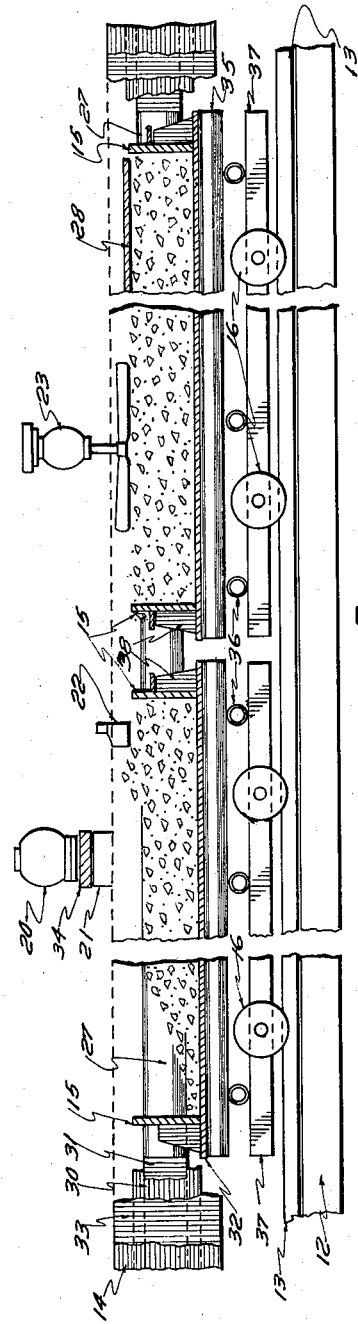
INVENTOR.
BY Robert A. Brown

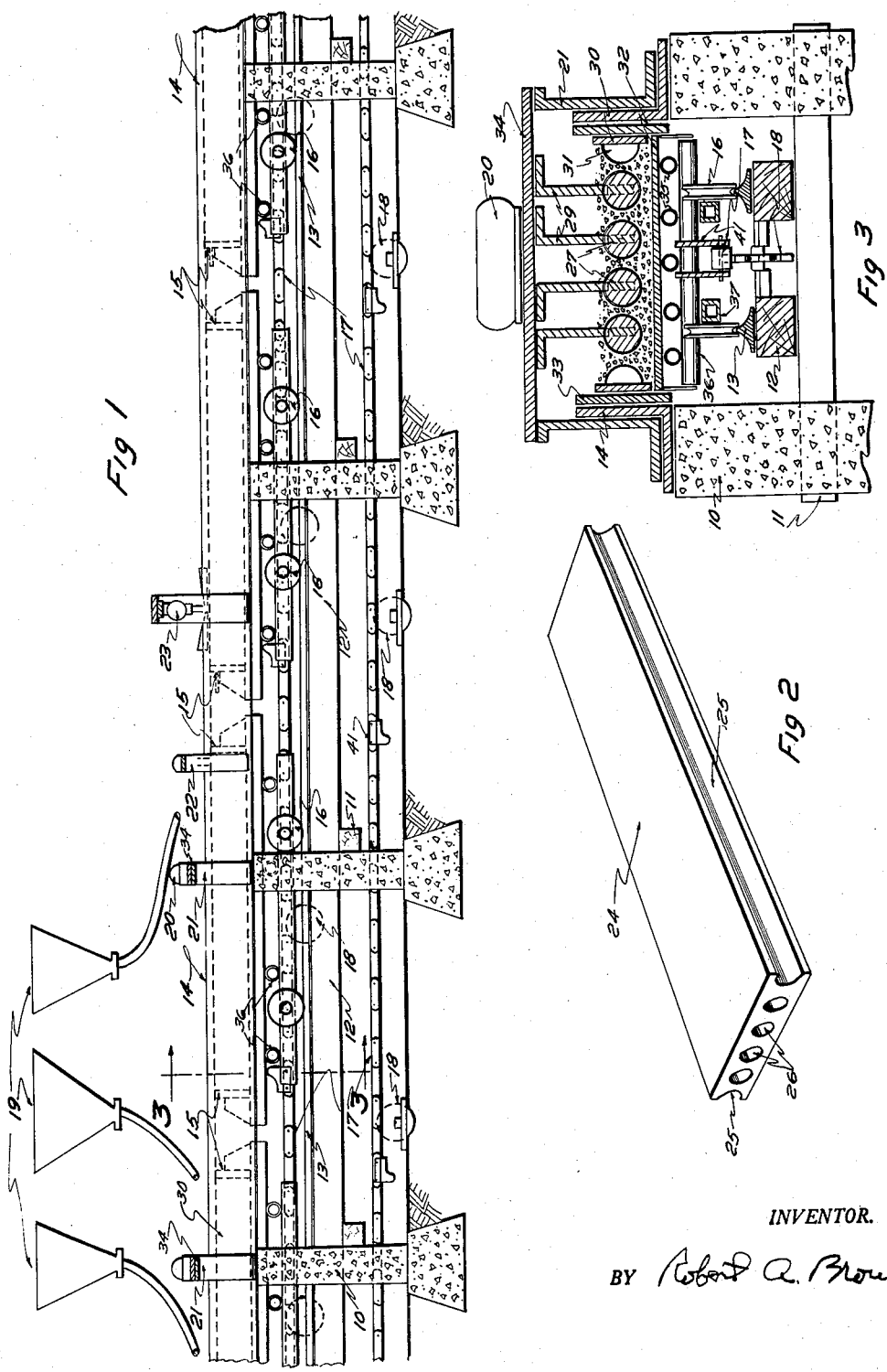

United States Patent Office 2,970,361
Patented Feb. 7, 1961

2,970,361

MOLDING MACHINE

Robert Abernathy Brown, Northridge, Calif., assignor to Marie A. Brown

Filed June 17, 1957, Ser. No. 666,188

4 Claims. (Cl. 25—99)

This invention relates to a means of molding elongated panels and objects of concrete, or other self hardening material, with core openings extending their full length.

The invention herein disclosed provides an improved means of molding elongated, cored concrete objects, such as panels, slabs, beams, pilasters, columns, etc. The cored, molded objects are produced in a continuous operation, the only limitation on length being practicability of transport or handling. The apparatus herein described remains in a horizontal position, uses no resilient mountings, and structural pallets rolling in close sequence, form a moving mold. There is no interruption in the continuity of the operation.

The combinations and arrangements of elements in this invention are set forth in the following description and specification, and are pointed out in the appended claims.

Two steel angle members, parallel and level, are securely mounted on concrete piers, forming the support for core tubes suspended from above at one end and at their midpoint in a fixed lateral and horizontal position with the side members; for a track under the core tubes on which rigid structural pallets, forming one face of a mold, are moved by a chain drive; for side plates and half cores affixed to each angle member; for a vibrating, compacting screed and for a motor operated trowel.

In the production cycle, structural pallets move in continuous close sequence in a constant horizontal and lateral position with the suspended core tubes. Masking end plates of the pallets, designed to pass about the core tubes and by the arms suspending them, are positioned to produce the desired length, the only limitation on length being feasibility of transport or handling. As each pallet approaches the fixed, supported end of the core tubes, zero slump concrete is distributed upon it and compacted at a level slightly above the bottom of the core tubes. As the pallet moves forward and the core tubes pass through the masking end plate, concrete is added to just cover the tubes, and past the midpoint suspension, concrete is brought to the final requisite level. Constant high frequency, low amplitude vibration applied to the core tubes, the side plates and half cores, compacts the concrete about the core tubes as it added to and moved along on the pallets and off the free standing end of the core tubes. A vibrating, compacting screed, past midpoint suspension of the tubes, strikes the moving concrete before it moves under the revolving trowel which finishes the top surface. A steel sheet, conforming to the size of the molded object, is placed upon the troweled face before the pallet moves past the free standing end of the core tubes. The molded, cored object remains on pallet until cured sufficiently to handle. The forming of core openings and molding the object, accomplished simultaneously, is a continuous operation.

Core openings in concrete panels, slabs, beams, pilasters, columns and other objects, serve many useful purposes. Economy in material, reduction in weight, runways for wirings, pipe, conduits for hot or cold air, placing reinforcing bars and prestressing are some of the useful advantages of core openings, which are rapidly and economically formed by the method and means herein disclosed.

In the three sheets of drawings accompanying this application and forming a part thereof, are shown one form the present invention may assume, but it is understood the invention is not limited thereby to the particular details therein shown, except insofar as defined in the appended claims.

Figure 1 is a schematic view in side elevation showing one form of apparatus by which the method involved in this invention can be carried out.

Fig. 2 is a perspective view of a product of the apparatus described in this application, a cored concrete panel, with half cores on each edge.

Figure 3 is a sectional view 3—3 Fig. 1, viewing in direction of arrows, showing core tubes, their midpoint suspension arms, concrete about the tubes, and other related details as utilized in this apparatus.

Fig. 4 is a top plan view of the apparatus, showing sequence of pallets, increment of concrete upon them and about the core tubes, position of vibrating, compacting screed, the revolving trowel, the top steel sheet in position; the production cycle is shown in sequence as the pallets approach, move along and pass the suspended core tubes.

Fig. 5 is a sectional view in side elevation along the lines 5—5 upon Fig. 4, with cutaway section at each end.

Fig. 6 is a view in side elevation of a structural pallet used in this apparatus.

Figures 7 and 8 are sectional views in elevation along the lines 7—7 and 8—8 respectively, of Fig. 6, showing masking end plates and related details as utilized in this apparatus.

Fig. 9 is a filler and waste plate as used with masking end plate, viewed in side and end elevation.

Referring to the accompanying drawings wherein similar characters designate similar parts throughout, angle members 14, parallel and level, are mounted on piers 10, supporting risers 21 and cross plate 34 from which arms 29 support core tubes 27; plates 33, affixed to angle members 14, support side plates 30 and half core tubes 31. As shown in the left end portion of Fig. 4, the members 27 and 31 have their ends pointed to prevent them from unnecessarily impeding the advance of the plastic cement. Mechanical vibrators 20, to aid in compacting the plastic substance, are affixed to cross plates 34; a vibrating, compacting screed 22, supported by members 14, is guided by top edge of side plates 30. A motor driven rotating trowel 23, is supported by angle members 14. Cross members 11 bolted to piers 10 support beams 12 carrying tracks 13 for pallet wheels 16. Pallets are propelled by motor driven link chain 17 with drive plates 41 spaced to engage cross member 36 of pallets. Concrete hoppers 19 are positioned to steadily distribute zero slump concrete upon the moving pallets. Face plate 32 of pallet is supported by pipes 35 which are carried by cross members 36, which in turn are secured to square shapes 37 to which pallet wheels 16 are affixed. End bumper plates 41 and skirt sheets 40 are affixed to ends and sides of pallets. Masking end plates 15, affixed to face plates 32 of pallets, can be positioned at any point desired. Masking end plates 15 pass about the suspended core tubes 27 and by the suspension arms 29, between the side plates 30 and about the half core tubes 31. Masking end plates 15 are supported by angle brace plates 38, openings in masking end plates 15 to pass by suspension arms 29 are closed by snapping filler waste plates in position, spring prongs engaging angle brace plates 38. Sprocket wheels 18 support motor driven endless link chain 17.

Structural pallets are positioned in sequence for cross members 36 to engage driving plates 41 of link chain 17, moving pallets along tracks 13 from left to right. Zero slump concrete is distributed and compacted upon pallet face sheet 32 as it approaches the fixed half cores and the supported core tubes 27. Pallets have a constant lateral and horizontal position with core tubes 27 and side plates 30, being guided by the lower edge of plates 30 and the face of plates 33.

It will be seen that this apparatus comprises a horizontally elongated supporting structure having a front and a rear end, and that along each side of said structure extends a row of piers 10, these piers being arranged in pairs wherein each pier at one side of the structure is opposite to a pier at the other side thereof, the piers at each side of the structure supporting a riser which is L-shaped in cross-section, the horizontal cross plates 34 being supported by said risers and bridging the space between them at intervals along the length of the structure. The arms supported by said cross plates are of an inverted L-shape, making it convenient to attach their upper portions to said cross plates abutting flatwise against them. A simplified, sturdy framework is produced by the aforesaid arrangement.

The concrete level is just above the bottom of the core tubes as they pass through the front masking end plate of the moving pallet. Concrete is steadily added and distributed as the pallet moves along and the concrete level is just above the core tubes as the front masking end plate passes the midpoint suspension arms 29 the space around the core tubes being unobstructed except where occupied by said arms. Total volume of concrete is added and distributed before the front masking end plate 15 reaches the vibrating, compacting screed 22, which strikes the excess concrete on filler waste plates 39, snapped in place as masking end plates 15 pass midpoint suspension arms 29. As the zero slump concrete is placed upon the moving pallet, constant high frequency, low amplitude vibration, applied to core tubes 27, side plates 30 and half cores 31 by vibrators 20, compacts and consolidates it about the suspended core tubes 27 and the fixed half cores 31, molding core and half core openings. The high frequency vibration brings moisture and latent fines to the surface of the vibrating metal parts and the concrete slips along the core tubes and the side plates and the half cores, the moisture and fines supplying the necessary lubrication for easy movement.

Placing concrete upon a sequence of moving pallets that form one face and two ends of a mold; the continuous addition of concrete as the pallets move along in constant horizontal and lateral relation with fixed core tubes positioned between anchored side plates; the compacting of the concrete on the moving pallet and about the positioned core tubes, produces a continuous cored, molded product of a length limited only by feasibility of handling and transport. A dense, uniform concrete is produced by vibration, the compacting screed and the revolving trowel. Moisture and latent fines on the surface of the vibrating metal parts supply lubrication for easy movement of the concrete through the apparatus. Adhesion and suction of the steel sheet placed upon the troweled concrete face support the top lip of the half core along each edge as well as the thin section of the face shell of the cored, molded product.

The details described above and shown in the accompanying drawings may be changed without departing from the scope and intention of the invention.

I claim:

1. A molding apparatus comprising a horizontally elongated supporting structure having a front and a rear end, said structure comprising a row of spaced apart piers extending along each side thereof, a riser L-shaped in cross-section extending along each side of said structure with its base supported by the piers at its side of the structure, substantially horizontal cross plates supported by and bridging the space between said risers at intervals along the length of the structure, a plurality of spaced apart arms attached to and extending downwardly from each of said cross plates, a set of parallel, substantially horizontal core tubes mounted upon said supporting structure and extending lengthwise thereof, said core tubes being supported by said arms and having pointed ends directed toward the rear end of said supporting structure, a substantially horizontal track mounted upon said structure and extending lengthwise thereof in a subjacent relation to said tubes, a plurality of pallets mounted upon said track to travel therealong, said pallets having bottoms supportable subjacent to said tubes, means mounted upon the said supporting structure to move said pallets from rear to front therealong, and means carried by said supporting structure to feed a plastic self-hardening substance to the advancing pallets in a sufficient quantity to submerge said tubes.

2. The subject matter of claim 1, and each of said arms being of an inverted L-shape with its upper end portion abutting flatwise against and secured to a said cross plate.

3. A molding apparatus comprising a horizontally elongated supporting structure having a front and a rear end, said structure comprising a row of spaced apart piers extending along each side thereof, a riser L-shaped in cross-section extending along each side of said structure with its base supported by the piers at its side of the structure, substantially horizontal cross plates supported by and bridging the space between said risers at intervals along the length of the structure, a plurality of spaced apart arms attached to and extending downwardly from each of said cross plates, a set of parallel, substantially horizontal core members mounted upon said supporting structure and extending lengthwise thereof, said core members being supported by said arms, a substantially horizontal track mounted upon said structure and extending lengthwise thereof in a subjacent relation to said core members, a plurality of pallets mounted upon said track to travel therealong, said pallets having bottoms supportable subjacent to said core members, means mounted upon said supporting structure to move said pallets from rear to front therealong, and means carried by said supporting structure to feed a plastic self-hardening substance to the advancing pallets in a sufficient quantity to submerge said core members.

4. The subject matter of claim 3, and each of said downwardly extending arms being of an inverted L-shape with its upper end portion abutting flatwise against and secured to a said cross plate.

References Cited in the file of this patent

UNITED STATES PATENTS

| | | |
|---|---|---|
| 1,517,713 | De Bay | Dec. 2, 1924 |
| 1,538,425 | De Bay | May 19, 1925 |
| 1,539,303 | De Bay | May 26, 1925 |
| 1,550,014 | De Bay | Aug. 18, 1925 |
| 1,782,413 | Dietrichs | Nov. 25, 1930 |
| 1,977,374 | Brooke et al. | Oct. 16, 1934 |
| 2,129,162 | Robillard | Sept. 6, 1938 |
| 2,713,709 | Wright | July 26, 1955 |

FOREIGN PATENTS

| | | |
|---|---|---|
| 723,009 | Great Britain | Feb. 2, 1955 |